US008576763B2

(12) United States Patent
Gonsa et al.

(10) Patent No.: US 8,576,763 B2
(45) Date of Patent: Nov. 5, 2013

(54) INTER-DOMAIN GROUP-COMMUNICATIONS

(75) Inventors: Osvaldo Gonsa, Langen (DE); Ralf Becker, Langen (DE); Rolf Hakenberg, Langen (DE); Jose Luis Rey, Langen (DE)

(73) Assignee: Panasonic Corporation, Osaka (JP)

( * ) Notice: Subject to any disclaimer, the term of this patent is extended or adjusted under 35 U.S.C. 154(b) by 971 days.

(21) Appl. No.: 12/159,751

(22) PCT Filed: Jan. 25, 2007

(86) PCT No.: PCT/EP2007/000646
§ 371 (c)(1),
(2), (4) Date: Aug. 5, 2008

(87) PCT Pub. No.: WO2007/110117
PCT Pub. Date: Oct. 4, 2007

(65) Prior Publication Data
US 2008/0298294 A1 Dec. 4, 2008

(30) Foreign Application Priority Data
Mar. 24, 2006 (EP) .................................. 06006160

(51) Int. Cl.
*H04L 12/28* (2006.01)
*H04J 3/26* (2006.01)
(52) U.S. Cl.
USPC ............................ 370/312; 370/390; 370/432
(58) Field of Classification Search
None
See application file for complete search history.

(56) References Cited

U.S. PATENT DOCUMENTS

| 2003/0134653 | A1* | 7/2003 | Sarkkinen et al. | 455/517 |
|---|---|---|---|---|
| 2004/0087319 | A1* | 5/2004 | Bos et al. | 455/458 |
| 2006/0229082 | A1* | 10/2006 | Terry | 455/450 |
| 2007/0002859 | A1* | 1/2007 | Corson et al. | 370/390 |
| 2009/0303909 | A1* | 12/2009 | Farhoudi et al. | 370/312 |
| 2010/0195529 | A1* | 8/2010 | Liu et al. | |

FOREIGN PATENT DOCUMENTS

| WO | 00/79734 | 12/2000 |
|---|---|---|
| WO | 2006/023484 | 3/2006 |

OTHER PUBLICATIONS

International Search Report dated Jun. 28, 2007.

\* cited by examiner

*Primary Examiner* — Chirag Shah
*Assistant Examiner* — Srinivasa Reddivalam
(74) *Attorney, Agent, or Firm* — Dickinson Wright PLLC

(57) ABSTRACT

The invention relates to group communication services, i.e. communication services involving two or more users (or service participants). The invention provides a method for distributing multicast data of a multicast service to different domains and a method for distributing multicast data to service participants in a domain. Further, the invention relates to a control node and system implementing the respective methods. To improve resource utilization when providing a multicast service, including inter alia PoC services, to service participants the invention provides mechanisms to avoid unnecessary multiplication of multicast data in the distribution tree for multicast services with service participants of different domains. For this purpose the controlling node that is initiating the multicast service upon request determined to which domains the multicast data is to be provided and only forwards the multicast data on a per-domain basis. Another aspect of the invention is the avoidance of unnecessary duplications of multicast data within individual domains.

20 Claims, 10 Drawing Sheets

INTER-DOMAIN GROUP-COMMUNICATIONS

FIELD OF THE INVENTION

The invention relates to group communication services, i.e. communication services involving two or more users (or service participants). The invention provides a method for distributing multicast data of a multicast service to different domains and a method for distributing multicast data to service participants in a domain. Further, the invention relates to a control node and system implementing the respective methods.

TECHNICAL BACKGROUND

IP Multimedia Subsystem (IMS)

IMS is defined by 3GPP as a new subsystem, i.e. a new mobile network infrastructure that enables the convergence of data, speech and mobile network technology over an IP-based infrastructure.

IMS was designed to fill the gap between the existing traditional telecommunications technology and internet technology that increased bandwidth alone will not provide. This will allow operators to offer new, innovative services that shareholders and end users are expecting.

IMS was specifically architected to enable and enhance real time, multimedia mobile services such as rich voice services, video telephony, messaging, conferencing, and push services. IMS is designed to enable these user-to-user communication services via a number of key mechanisms including session negotiation and management, Quality of Service (QoS) and mobility management. However, IMS enables much more than just real time user-to-user services.

The mobile industry is in a transition phase from traditional voice and short message service centric business to a variety of new and exciting multimedia services and applications. Telephony and messaging is about to be complemented by the next generation of person-to-person applications, making sharing easier—two-way radio sessions (Push-to-Talk), sharing a view, sharing files, shared whiteboards and multiplayer game experiences. It also brings the ability to combine existing services in exciting ways, for example when adding a multiplayer game during a Push-to-Talk session.

The IP Multimedia Subsystem (IMS) does not only encompass its deployment in cellular/wireless networks (such as 3G networks—see for exemplary purposes 3GPP TR 23.228 "IP Multimedia Subsystem (IMS); Stage 2", V. 7.2.0, available at http://www.3gpp.org) but also enables new services between mobile and fixed devices. Examples of such services can be content sharing or messaging services between a mobile terminal and PC.

Push-to-talk Over Cellular (PoC)

One of the services utilizing the IMS infrastructure are Push-to-talk applications like Push-to-talk Over Cellular (PoC) that is developed and standardized by the Open Mobile Alliance (OMA).

Push to talk over Cellular (PoC) provides a direct one-to-one and one-to-many voice communication service over cellular networks. The idea is simple. Thanks to PoC's 'always-on' connection, users can make calls to individuals or groups at the press of a button. The availability of other users can be checked before the call with the help of the presence function. The call connects almost instantly and the receiver doesn't even have to answer. Users of push to talk services are often engaged in an activity other than a telephone call and can stay informed by listening in to group traffic while they are busy. A user can also be contacted by name or may occasionally want to say something to the group. PoC is based on half-duplex Voice over IP (VoIP) technology, using an IP-capable network, i.e. one participant can speak at a time while the other participants receive the voice data Push to talk is not a substitute for any existing cellular service. It is a complementary service that allows operators to develop and differentiate their voice portfolio without having to change their existing services.

The OMA PoC standard network architecture is based on a PoC application server (PoC AS) connected to the IP Multimedia Subsystem (IMS) as exemplarily illustrated in FIG. 10. The IMS takes care of common functions, such as user authentication, call routing and generic charging based on the Session Initiation Protocol (SIP).

For further reading it is referred to the OMA website http://www.openmobilealliance.org, especially to the OMA drafts "Push to talk over Cellular (PoC)-Architecture", Candidate Version 1.0, 27 Jan. 2006 and "Push to talk over Cellular (PoC)-Architecture", Draft Version 2.0, 14 Mar. 2006 (available at http://www.openmobilealliance.org)

The PoC application servers handle application-specific tasks such as floor control (the reservation of talk spurts for one speaker at a time). They also provide interfaces to the operator's provisioning and network management systems and create application-specific charging detail records (CDRs). The push-to-talk user database contains provisioned users and their service profiles. The users and talk groups can be arranged in the database in organization-specific closed user groups to support the security and administration capabilities needed in business applications. The push-to-talk solution can be scaled up to multimillion user networks with several networked PoC application servers.

As indicated in FIG. 10, various cellular access networks may be used to distribute the PoC media data to the PoC users. The cellular access networks are also referred to PoC enablers. Examples for PoC enablers are 3GPP networks, GSM networks or 3GPP2 networks. Architectural requirements for 3GPP networks as PoC enablers can be found in 3GPP TR 23.979 "3GPP enablers for Open Mobile Alliance (OMA); Push-to-talk over Cellular (PoC) services; Stage 2", V. 6.2.0 (available at http://www.3gpp.org).

The push-to-talk service is based on multi-unicasting. Each sending client sends packet data traffic to a dedicated push-to-talk server and, in the case of a group call, the server then duplicates the traffic to all the recipients. No multicasting is performed either in the access or core network and the mobility management is carried out by the radio network. This is why the push-to-talk solution works transparently over the cellular and fixed networks. PoC call control and other signaling is based on the IETF-defined SIP and voice traffic is carried through an RTP/RTCP-based streaming bearer. Mobility is handled through (E)GPRS using support wide-area roaming over GSM/WCDMA.

A PoC solution protocol stack is shown in FIG. 11. On the application level, the PoC applications are provided. For session related signaling, typically SIP is used so as to establish, change or tear down the session. For media transport RTP/RTCP is commonly used. The signaling and transport related protocols SIP and RTP/RTCP are transported by UDP (also TCP is possible) and by the IP protocol. The IP packets are finally provided to the service participants in the different access networks using access network specific channel, such as 3GPP mobile channels.

Potential Problems

The PoC service is based on a conferencing focus, i.e. a central element controlling the communication, which is called PoC Application Server (PoC AS). All participants are connected to this node resulting in a star-topology underlying the PoC service. As one of the main functions, the PoC AS implements floor control i.e. controls the permission to speak. The participant that gained the floor transmits its voice data to the PoC AS, which in turn distributes it to all other participants.

In general the PoC AS is implemented as an application server of the IP Multimedia Subsystem (IMS). Participants of the PoC service can be connected to the PoC AS via any IP-Connectivity Access Network (IP-CAN) providing access to the IMS network. This includes GPRS access with a GERAN and/or UTRAN radio access as specified by the 3$^{rd}$ Generation Partnership Project (3GPP).

The deployment of a PoC Application Server as a conferencing focus allows for easy (centralized) control of the service. The group communication is realized using many point-to-point connections. However, for increasing group sizes this point-to-point nature leads to inefficient distribution of the service data. The same data has to be copied and transmitted individually for each participant. This becomes particularly relevant for wireless participants utilizing scarce radio resources to access the service.

As outlined above there is a need for efficient distribution of the group communication, especially considering large group sizes and scarce radio resources. To avoid the Inefficiencies of multiple point-to-point transmission it is obvious to utilize point-to-multipoint transport or multicasting whenever possible.

Regarding GPRS-based IP-CAN to the IMS network this functionality is provided by the Multimedia Broadcast/Multicast Service (MBMS). It establishes a multicast delivery tree in the GPRS core network and utilizes radio broadcast efficiently transmitting data to a large group of users. MBMS is supported in UTRAN as well as GERAN radio access networks.

This utilization of MBMS for IMS services and PoC in particular is recently discussed in 3GPP standardization groups. The issue is tackled in a 3GPP work item and respective service requirements have been defined in 3GPP TS 22.228, "Service requirements for the Internet Protocol (IP) multimedia core network subsystem (IMS); Stage 1", V. 7.3.0 (available at http://www.3gpp.org). Further, some technical proposals have been made how to realize MBMS utilization for IMS services. However, the current discussion focuses on the usage of MBMS in a local domain, e.g. inside a single operator's network, which represents only a limited service scenario.

To better understand the invention and the difference to prior art the full service scenario has to be understood. Generally it is possible for IMS services to span different domains, e.g. involving different operator networks. Naturally, this is also possible for the PoC service. To support this inter-domain scenario the PoC AS can take over different logical and functional roles in a PoC call. Either it can perform the Controlling PoC Function or Participating PoC Function, or both at the same time. The Controlling PoC AS acts as the conference focus executing call control, whereas the Participating PoC AS acts as a proxy forwarding signaling and data between the PoC User in its local domain and the Controlling PoC AS in another domain. There is always one single Controlling PoC AS, but there could be many Participating PoC AS, e.g. in different operator domains, present in a PoC call. Usually the PoC AS serving the user initiating the PoC call takes over the role of the Controlling PoC AS.

Although current standardization activities in this field are ongoing and not finalized, it may be assumed MBMS transport functionality to be available for a PoC service. The controlling element of MBMS is the Broadcast-Multicast Service Centre (BM-SC). Utilization of MBMS for a PoC service can be achieved in several ways. A new interface between the PoC AS and the BM-SC could be established allowing the interaction of both (separate) elements. Another way could be to integrate both functional modules into a single element. However, from a functional perspective both options are equal.

The MBMS functionality is available within a GPRS-based IP-CAN, as already stated before. Generally this is under the control of a specific network operator. With respect to the inter-domain scenario outlined above, this results in the situation that support for MBMS transport functionality is a local property of a specific PoC AS, because a PoC call could span multiple operator domains. Therefore, it has to be assumed that MBMS might not be available at all PoC AS involved in the call.

MBMS support in the network is one aspect, which has to be considered for its utilization in a PoC service. Another one is that MBMS reception depends on terminal capabilities. Some terminals might not be able to receive MBMS in parallel to an IMS service like PoC. Others might not be able to receive MBMS at all. Therefore, it has to be assumed that MBMS might not be supported by all PoC users.

The main problem arising in the full service scenario outlined above is caused by the different functional roles of each PoC AS involved in a PoC call. As MBMS transport support is a local property of a PoC AS, the Controlling PoC AS does not know whether the Participating PoC AS utilizes MBMS transport functionality and assumes point-to-point connected users.

Therefore (as indicated already above), the Controlling PoC AS establishes individual connections for each participant to the Participating PoC AS and distributes individual copies of incoming voice data. In case MBMS transport functionality is utilized in the local domain, the Participating PoC AS would forward all voice data received on any connection to the BM-SC. Therefore, all individual copies of the same voice data would be transmitted on the MBMS bearer. As all participants in the local domain receive this MBMS bearer, each participant would also receive all copies of the same voice data, instead of receiving it just once.

On the one hand this unnecessary transmission of voice data copies is of course a waste of resources, especially on the radio interface. On the other hand the reception of multiple voice data duplicates at the terminals cannot be rendered in a sensible way to the PoC users and might cause sever problems in the receiving applications.

The scenario and its potential problems are exemplarily depicted in FIG. 12.

As a conclusion, unnecessary transmission of voice data copies occur (1) between the Controlling and Participating PoC AS and
(2) in the downlink MBMS bearer of a PoC call.

Another problem arising in the full service scenario is related to the decision whether to utilize MBMS transport functionality for a PoC call. Although the PoC service enables group communication and MBMS enables efficient distribution of data to a group of users, it might not be sensible in all cases to use available MBMS transport functionality. Due to its properties, especially on the radio interface, there is a trade-off regarding efficient data transmission and resource consumption for MBMS.

Therefore, it only makes sense to use MBMS transport for a large or dense group of users. In this respect, it is important to have accurate group information available as a basis for the MBMS decision at the PoC AS. This is the case for the Controlling PoC AS, which receives complete group information in the request from the initiating PoC user. But this is not the case at the Participating PoC AS. Here the group information has to be derived from separate signaling messages, which might complicate the decision on MBMS utilization for a PoC call.

SUMMARY OF THE INVENTION

The object of the invention is to provide improve resource utilization when providing a multicast service, including inter alia PoC services, to service participants.

The object is solved by the subject matter of the independent claims. Advantageous embodiments of the invention are subject matters to the dependent claims.

One main aspect of the invention is to avoid unnecessary multiplication of multicast data in the distribution tree for multicast services with service participants of different domains. For this purpose the controlling node that is initiating the multicast service upon request determined to which domains the multicast data is to be provided and only forwards the multicast data on a per-domain basis.

Another aspect of the invention is the avoidance of unnecessary duplications of multicast data within individual domains. According to this aspect, the controlling nodes of a domain obtains information on the service participants that are to receive the service within its domain and the controlling node may decide on a per-domain or per-radio access subsystem basis whether to utilize point-to-point links or a point-to-multipoint link within the domain or radio access subsystem respectively to provide the multicast data to the service participants in its domain. This operation may be advantageous in that it allows optimized resource utilization within the domain.

According to one embodiment of the invention a method for distributing multicast data of a multicast service to different domains is provided. The controlling node of a first domain of the different domains receives a service initiation request identifying the service participants to participate in the multicast service. Based on the identification of the service participants, the controlling node identifies the domains to which the service participants belong and that are not controlled by the controlling node of the first domain, and distributes multicast data to controlling nodes of the identified domains on a per-domain basis.

Further, in another embodiment of the invention, the controlling node may transmit a service initiation request to the controlling nodes of the identified domains. A service initiation request transmitted to a controlling node may comprise the service participants belonging to the respective domain controlled by the controlling node. Informing the controlling nodes of the identified domains on the service participants in their respective domain may be advantageous in that the information may facilitate the decision on the most suitable transport to be utilized in the domains for providing the multicast data to the service participants of the respective domain.

According to another embodiment, the controlling node of the first domain establishes a point-to-point link to a controlling node of each of the identified domains on which the multicast data is to be forwarded to a respective controlling node.

In another embodiment of the invention, a single copy of the multicast data is distributed via a point-to-point link to the controlling node of a respective one of the identified domains for further distribution to the service participants in the respective domain. As indicated above, the per-domain distribution of multicast data may advantageously avoid unnecessary duplication of multicast data on the interface between the controlling nodes of different domains. A single copy of the respective multicast data may be distributed to a controlling node of a respective domain, even if the there is a plurality of service participants in the respective domain.

According to a further embodiment of the invention, the controlling node (of the first domain) receives a negative acknowledgment in response to a service initiation request from a controlling node of one of the identified domains. In response to the negative acknowledgment, it may then transmit an individual service initiation request to each of the service participants in the domain controlled by the controlling node responding with the negative acknowledgment. This operation may be advantageous in that compatibility with standard control nodes that are not improved as described herein may be obtained.

Another embodiment of the invention relates to a method for distributing multicast data of a multicast service to service participants within a domain. The controlling node of the domain may first receive a service initiation request from a controlling node of another domain. This service initiation request may comprise information on the service participants to participate in the multicast service being located in the domain controlled by the controlling node.

Based on the information on the service participants, the controlling node of the domain may decide whether to utilize point-to-point links or a point-to-multipoint link for distributing the multicast data within the domain. According to this decision the controlling node establishes either a point-to-point link to a respective one of the service participants in the domain or a point-to-multipoint link to the service participants in the domain as a transport medium for the multicast data, and distributes the multicast data to the service participants in the domain via the established transport medium.

In case there are multiple radio network subsystems within a domain, it may be advantageous to make the decision on which transport medium to utilize on a per-radio network subsystem basis instead of on a per-domain basis to further optimize resource utilization. Accordingly, another embodiment of the invention proposes that the controlling node determines the at least one radio network subsystems serving the service participants. The decision on the utilization of point-to-point links or the point-to-multipoint link may then be made per determined radio network subsystem, and so that a point-to-point link per service participant or a point-to-multipoint link may be established in each determined radio network subsystem.

Another advantageous embodiment accounts for a possibly changing number of service participants in a domain or in the radio network subsystems, e.g. due to user mobility, new users participating in the service or leaving the service. According to this exemplary embodiment, the transport medium is switched from point-to-point links to a point-to-multipoint link or vice versa depending on number of service participants currently participating in the multicast service within the domain. The switching from point-to-point links to a point-to-multipoint link may be alternatively made on a per-radio network subsystem basis.

In case a point-to-multipoint link is to be used for distributing the multicast data, another embodiment of the invention foresees the use of domain-wide multicast services, such as. e.g. MBMS, that may be utilized to distribute the multicast data in a domain. Typically, these multicast services are provided by a functional entity within the domain that is referred to as a multicast service center. According to this embodiment the controlling node of a domain may forward the multicast data to a multicast service center within the domain, so as to utilize the multicast service that may be available in the domain on a domain-level or radio network subsystem level basis.

In another embodiment of the invention the controlling node of a domain may further acknowledge the service initiation request, i.e.—in other words—provides positive or negative feedback in form of an acknowledgement or error message. The return of positive feedback may establish a point-to-point link to the controlling node of the other domain. Further, a multicast service identifier may be assigned to the link to allow identifying data of the multicast service on the point-to-point link.

In a variation of this embodiment the multicast service identifier may be further associated with a multicast service identifier used by a multicast service center within the domain to identify the multicast service data when being distributed to the service participants in the domain. This operation may be advantageous if the different identifiers are used for the multicast data when being distributed inter-domain and within a domain.

According to another embodiment of the invention the controlling node of the domain may further generate a service initiation request for each service participant identified in the service initiation request received from the controlling node of the other domain, and may transmit the at least one generated service initiation request to the service participants of the domain. By this operation of the controlling node, it becomes inter alia possible to generate the service initiation requests for a multicast service within the individual domain and not at the controlling node receiving the initial service initiation request, which may in turn reduce the inter-domain signaling load between the controlling nodes.

According to an exemplary variation of this embodiment the service initiation request for each service participant comprises the multicast service identifier to be used by the multicast service center within the domain to identify the multicast service data. This may be especially beneficial, if the multicast data are to be transmitted to service participants via a point-to-multipoint link employing a special multicast service delivery mechanism within the domain (e.g. MBMS) utilizing its own service identifier (e.g. in case of MBMS, a specific multicast address).

Another embodiment of the invention relates to an efficient utilization of multicast services for the provision of multicast data within a domain. To support fast service activation for the multicast service that is providing the multicast data to service participants, it may be advantageous that the controlling node of the domain subscribes the service participants of the domain at a multicast service center within the domain. For example, when utilizing MBMS for the provision of the multicast data to service participants, the controlling node may subscribes the participants at the BM-SC of the domain.

A further embodiment of the invention provides a controlling node of a first domain for distributing multicast data of a multicast service to different domains. This controlling node comprises a receiver for receiving a service initiation request identifying the service participants to participate in the multicast service, and a processor for identifying, based on the identification of the service participants, the domains to which the service participants belong and that are not controlled by the controlling node of the first domain. Moreover, the controlling node includes a transmitter for distributing multicast data to controlling nodes of the identified domains on a per-domain basis.

Another embodiment of the invention relates to a controlling node for distributing multicast data of a multicast service to service participants in its domain. The controlling node comprises a receiver for receiving a service initiation request from a controlling node of another domain comprising information on the service participants to participate in the multicast service being located in the domain controlled by the controlling node, and a processor for deciding based on the information on the service participants, whether to utilize point-to-point links or a point-to-multipoint link for distributing the multicast data within the domain, and for establishing, depending on the decision, either a point-to-point link to a respective one of the service participants in the domain or a point-to-multipoint link to the service participants in the domain as a transport medium for the multicast data. Moreover, the controlling node includes a transmitter for distributing multicast data to the service participants in the domain via the established transport medium.

In another embodiment the controlling nodes above further comprise means adapted to perform the steps of the method for distributing multicast data of a multicast service to different domains or the method for distributing multicast data of a multicast service to service participants within a domain according to one of the various embodiments above.

Moreover, another embodiment of the invention provides a system comprising at least one controlling node according to one exemplary embodiment of the invention.

Further, the present invention according to another embodiment provides a computer readable medium storing instructions that, when executed by a processor of a controlling node of a first domain of different domains, cause the controlling node to distribute multicast data of a multicast service to different domains. The controlling node is caused to distribute the multicast data by receiving a service initiation request identifying the service participants to participate in the multicast service, identifying, based on the identification of the service participants, the domains to which the service participants belong and that are not controlled by the controlling node of the first domain, and distributing multicast data to controlling nodes of the identified domains on a per-domain basis.

According to one further embodiment of the invention a computer readable medium is provided that is storing instructions that, when executed by a controlling node of a domain, cause the controlling node of the domain to distribute multicast data of a multicast service to service participants in the domain. The controlling node is caused to distribute the multicast data by receiving a service initiation request from a controlling node of another domain comprising information on the service participants to participate in the multicast service being located in the domain controlled by the controlling node, deciding based on the information on the service participants, whether to utilize point-to-point links or a point-to-multipoint link for distributing the multicast data within the domain, establishing, depending on the decision, either a point-to-point link to a respective one of the service participants in the domain or a point-to-multipoint link to the service participants in the domain as a transport medium for the multicast data, and distributing multicast data to the service participants in the domain via the established transport medium.

Another embodiment relates to a computer readable medium that further stores instructions that, when executed by the controlling node of the first domain, cause the controlling node to perform the steps of the method for distributing multicast data of a multicast service to different domains or the method for distributing multicast data of a multicast service to service participants within a domain according to one of the various embodiments described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
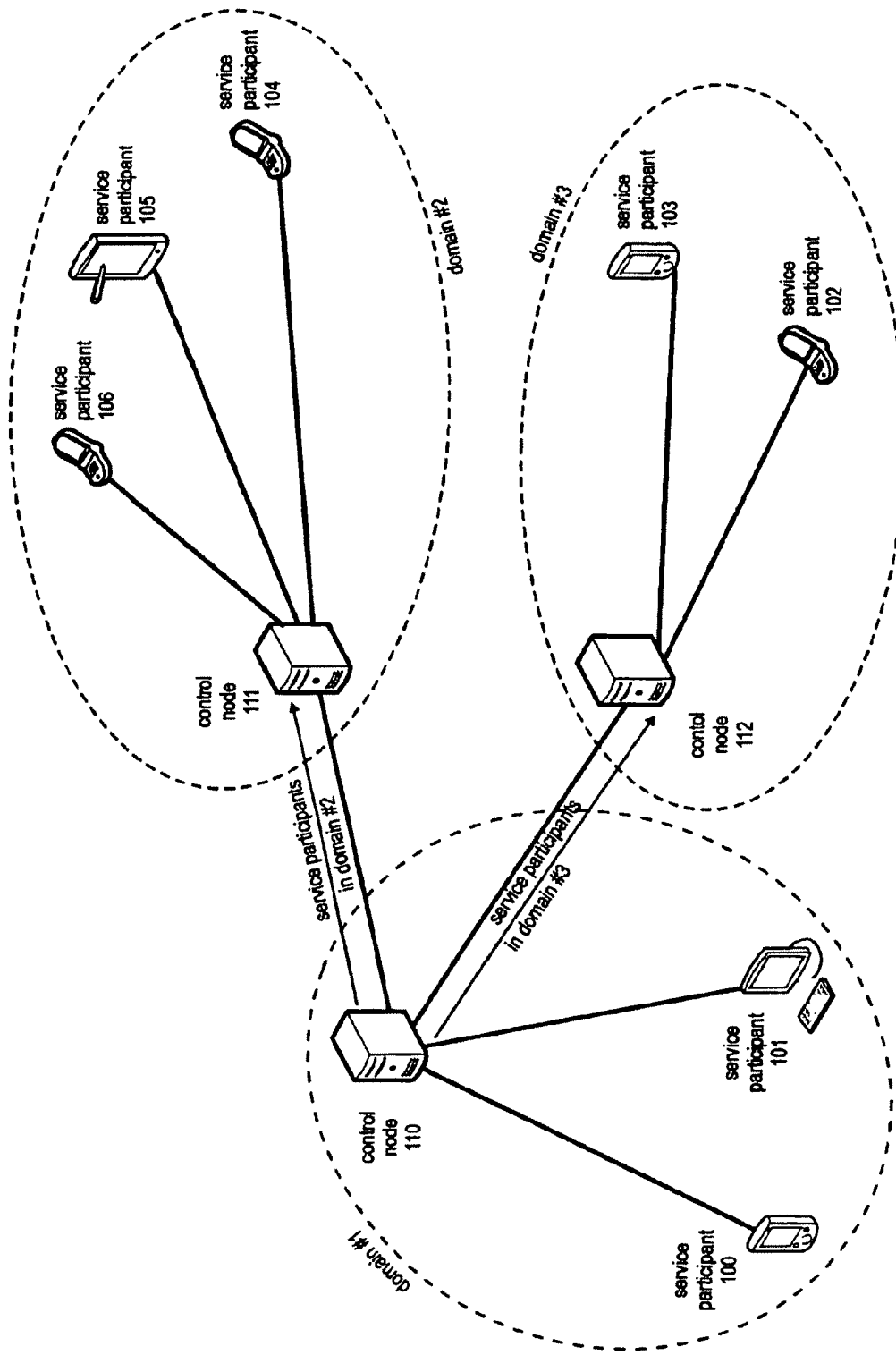
FIG. 1 shows an exemplary overlay-network providing data of an inter-domain multicast service to service participants according to an embodiment of the invention.

In the following different embodiments of the invention will be described that partially relate to PoC multicast services within an IMS network infrastructure via MBMS-enabled 3GPP wireless networks. It is to be understood that these exemplary and more specific embodiments are not intended to limit the ideas underlying the invention to these specific embodiments. Also the more detailed information in the background art section is intended to illustrate possible network architectures and scenarios in which the principles of the invention may be applied.

The ideas of the invention are especially applicable to multicast services that use a centralized approach where a central element controls the communication of the service. One of the main ideas of the invention is to use a distributed approach instead of a centralized approach in particular functions of multicast service control as well as in the distribution of multicast service data. Certain functions that are typically performed by the central controlling element are distributed on the domain level, i.e. functions that can be more efficiently handled on the domain-level are distributed to controlling nodes of the respective domains in which service participants to receive the multicast service are located. Another aspect of this idea is the exchange of information necessary to allow the controlling nodes to perform the new functions.

The distribution of functionality to the domain level may allow reducing the signaling overhead and may optimize the utilization of resources between the controlling nodes of the domains as well as within the domains as will become more apparent from the exemplary embodiments described below.

It is also recognized that the solutions according to the different embodiments of the invention described herein may be for example advantageously used in IMS services such as PoC where service participants belong to different administrative domains. A domain within the meaning of this document is a group of computers and devices on a network that are administered as a unit with common rules and procedures. Usually all devices on this network are owned and maintained by a specific network operator.

Two main drawbacks of conventional PoC services have been identified herein. First, the Controlling PoC AS has typically no knowledge on the transport capabilities available within the other domains in which the PoC service data are to be distributed. This leads to a multiplication of the signaling load and service data load on the interfaces between the Controlling PoC AS and the Participating PoC AS.

Second, the Participating PoC ASs have no knowledge on the service participants in their own domain (or they may at best derive this information from the forwarded SIP signaling, which is however not very reliable), so that it is difficult (if not impossible) for a Participating PoC AS to choose the optimum transport mechanism within their domain for distributing the PoC service data in the domain. Due to being unaware of the service participants in the domain, "expensive" resource consuming point-to-point links are used to distribute the service data in the Participating PoC AS-controlled domains are used or several copies of identical service data is provided via a multicast service to the service participants.

These drawbacks may be well generalized to multicast services that use a similar centralized approach as the PoC service described above.

To tackle the first drawback, one embodiment of the invention suggests that the controlling node receiving a service initiation request in a first domain determines the domains in which the service participants are located and distributes multicast data of the service to the controlling nodes of the other determined domains on a per-domain basis (instead of on a per-participant basis).

Figure 4:
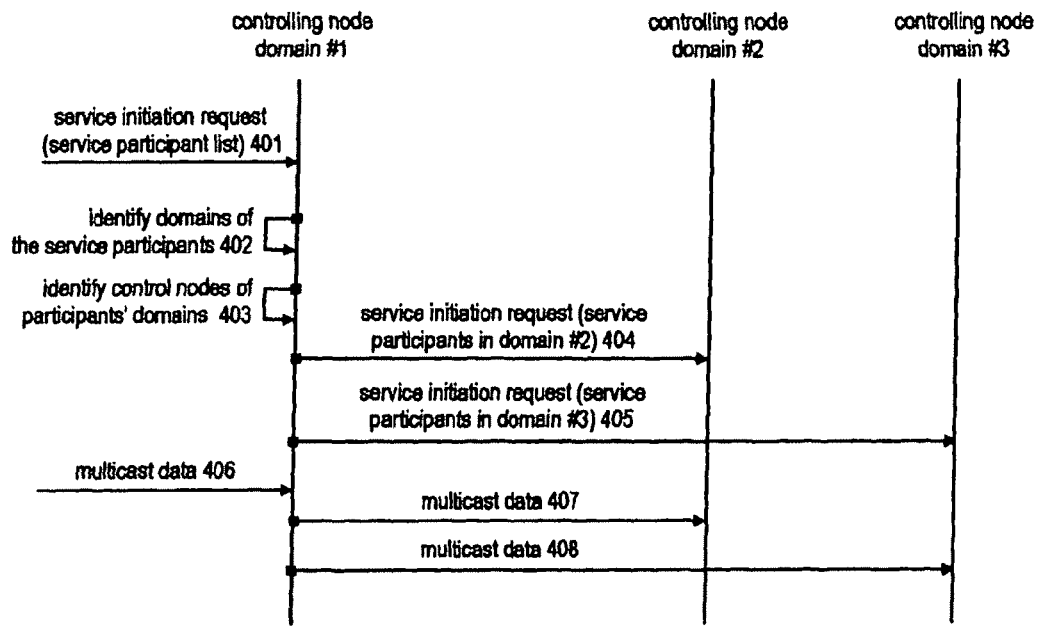
FIG. 4 shows the signaling and data transfer between controlling nodes of different domains according to an exemplary embodiment of the invention.

This idea will be described in more detail with respect to FIG. 1 and FIG. 4 in the following. FIG. 1 shows an exemplary overlay-network providing data of an inter-domain multicast service to service participants according to an embodiment of the invention. FIG. 4 shows the signaling and data transfer between controlling nodes of different domains according to an exemplary embodiment of the invention.

For exemplary purposes it is assumed that setup of a multicast service is requested by a client 100. The client 100 transmits a service initiation request to its local controlling node that is controlling node 110 of domain #1 in this example. The service initiation request identifies the potential service participants that are to participate in the service.

The identification of the service participants may be accomplished unique IDs identifying the individual service participants. Alternatively, there may be groups or lists preconfigured that contain an appropriate identification of the users belonging to the group or list. The respective groups or lists may be individually assigned an ID that may be used by the client 100 to identify the potential service participants.

For example, when using SIP as signaling protocol for service setup, this service initiation request may be a SIP INVITE message that—inter alia—identifies the service participants that are to participate in the multicast service. Typically, a SIP URI can be used to identify the participants. For details on the SIP protocol and message formats it is referred to RFC 3261, "SIP: Session Initiation Protocol" by the IETF (Internet Engineering Task Force) from June 2002 (available at http://www.ietf.org) incorporated herein by reference. Further, signaling compression as defined in RFC 3320, "Signaling Compression (SigComp)" of the IETF from January 2003 (incorporated herein by reference) may be used to reduce the size of SIP messages.

The controlling node 110 receives the service initiation request (see step 401) and determines (see step 402) the domains to which the different service participants indicated in the request belong. It should be noted that it is generally sufficient that the request from client 100 indicates one more service participant, i.e. that there are least two users to participate in the service.

In the example illustrated in FIG. 1, it may be assumed that the service initiation request identifies the clients (service participants) 101 to 106. Accordingly the controlling node 110 determines 402 that participant 101 belongs to its own domain #1 and that participants 102 & 103 and participants 104, 105 & 106 are located in domain #2 and domain #3, respectively.

For example when using a SIP URI as an identifier of the service participants, the different domains can be determined from the host part of the SIP URI, which either contains a fully-qualified domain name or numeric IPv4 or IPv6 address. For example the domain of the SIP URI 'joe@example.com' would resolve to 'example.com'.

Next, the controlling node 110 will identify 403 the controlling nodes (here: controlling nodes 111 and 112) that serve the identified domains, i.e. domain #2 and domain #3 in the example.

The identification of the controlling nodes of the different domains may be accomplished in different fashions. For example, the controlling node 110 could use a preconfigured list of controlling nodes in other domains. Alternatively, controlling node 110 may derived this information from previous (signaling) communication with other domains. Another option is to use some well-known names for the controlling nodes, which might also be used by the service participants to initiate a service, e.g. 'ConferenceFactory@example.com'.

Upon having identified the controlling nodes 111 and 112 of domains #2 and #3 the controlling node 110 may optionally send a service initiation request message to each of the controlling nodes 111 and 112. Each respective service initiation request message sent to the controlling nodes 111 and 112 identifies the service participants in the domain controlled by the respective controlling node, i.e. service participants 102 and 103 in the request message transmitted to controlling node 112 and service participants 104, 105 and 106 in the request message transmitted to controlling node 111. As will be explained below in more detail, the controlling nodes service initiation request message may forward individual service initiation requests to the individual indicated service participants within the domains to establish the multicast service.

In principle, it is sufficient for the controlling node 110 to identify the different domains in which the potential service participants are located so as to distribute the multicast data on a per-domain level. Upon receiving 406 multicast data to be distributed to the service participants (for example from client 100), the controlling node 110 may distribute 407, 408 the service data to the controlling nodes 111 and 112 of the "identified" domains, instead of generating individual copies of the data and providing same on a per-participant basis to the controlling nodes of the other domains for delivery to the service participants.

Consequently, by identifying the different domains to which the multicast service data are to be provided the load due to multicast data distribution (and due to signaling) may be reduced, as only one copy of the multicast data is forwarded to a respective one of the identified domains.

As indicated above and as will be discussed with respect to FIG. 5, it may be advantageous to provide identification of service participants within a domain to the controlling nodes of the respective domain (steps 404, 405 in FIG. 4). Strictly speaking, in domains where participants do not have to be invited to a session and/or need to be informed on system resources of the service no identification may be needed. Nevertheless, in various embodiments of the invention, an identification of service participants is included in the service initiation request (steps 404, 405).

Figure 5:
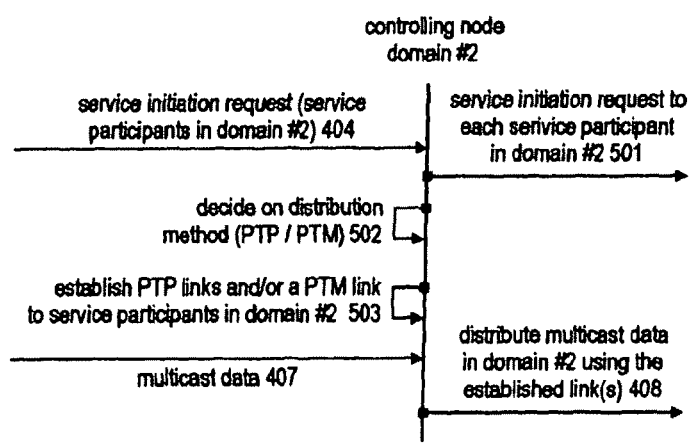
FIGS. 5 and 6 show exemplary operations of a controlling node within a domain enabling an inter-domain multicast service according to exemplary embodiments of the invention.

FIG. 5 shows an exemplary operation of a controlling node within a domain enabling an inter-domain multicast service according to exemplary embodiments of the invention. For exemplary purposes, the controlling node in FIG. 5 is assumed to correspond to same in FIG. 4 and controlling node 111 in FIG. 1.

Upon reception 404 of the service initiation request, controlling node may generate an individual service initiation request for each service participant that is indicated in the service initiation request previously received by the controlling node 111. The generated at least one service initiation messages is then transmitted 501 to the service participants 104, 105, 106 of domain #2.

For example if using SIP as a signaling protocol to set up the service, this initiation request message could be a SIP INVITE message. In response to a service initiation message, the participants may answer with an acknowledgment message. In case a service is established locally within the domain #2 between controlling node 111 and the individual participants, the controlling node 111 handles the response to its service initiation request. Otherwise, if the service session is established between controlling node 110 of domain #1 and the service participants within domain #2, controlling node 111 forwards the responses from the service participants 104, 105, 106 in its domain to controlling node 110 of domain #1.

Further, the controlling node 111 of domain #2 may decide 502 on the distribution method to be used within its domain for distributing multicast service data to the service participants 104, 105, 106. As the service initiation request includes the information on the service participants in its domain, controlling node 111 may for example derive the number of service participants in its domain from the information.

Generally, controlling node 111 may decide whether a point-to-point links (e.g. dedicated transport channels or connections) are used to provide the service data to the service participants 104, 105, 106. Alternatively, a point-to-multipoint link (e.g. a shared or common transport channel) may be used for this purpose. Which of these two transport methods to choose may—for example—depend on the current load on wired and/or air interfaces within the domain, the number of service participants to receive the multicast service in the domain or radio network subsystem, etc. To obtain appropriate decision criteria, radio resource information may be made available to the controlling node 111 (or if using a domain specific multicast service transport mechanism to the multicast service center 301). For example, if the number of service users exceeds a given or configured threshold, the controlling node 111 may decide to use a point-to-multipoint link, otherwise individual point-to-point links.

Also if the number of service participants varies during service provision, the distribution method may be reevaluated event triggered (e.g. upon joining/leaving of participants, upon handover of participants to other radio network subsystems or networks, etc.) or on a periodical basis. If the evaluation shows that it is more efficient to use another transport mechanism, controlling node 111 may switch the transport mechanism from point-to-point links to point-to-multipoint links or vice versa, as needed.

Upon having decided, which transport mechanism to use, the appropriate resources are established in the domain #2. For example, if point-to-point links are to be used, the controlling node 111 may initiate the establishment of dedicated channels or connections to the individual service participants 104, 105, 106. If a point-to-multipoint link is to be used, for example, a common or shared channel may be established to serve participants 104, 105, 106.

Another option to establish a point-to-multipoint link is the utilization of multicast service transport mechanisms already provided in the domain. For this purpose, there may be provided a multicast service center 301. The multicast service center 301 may be a functional or physical entity in the domain responsible to provide a multicast service to the users within the domain utilizing a point-to-multipoint connection. If the multicast service center is a functional entity it may for example be located within the same network element as the controlling node 111. An example for a multicast service mechanism is MBMS of 3GPP networks and, in this case, the multicast service center 301 corresponds to the BM-SC.

Figure 3:
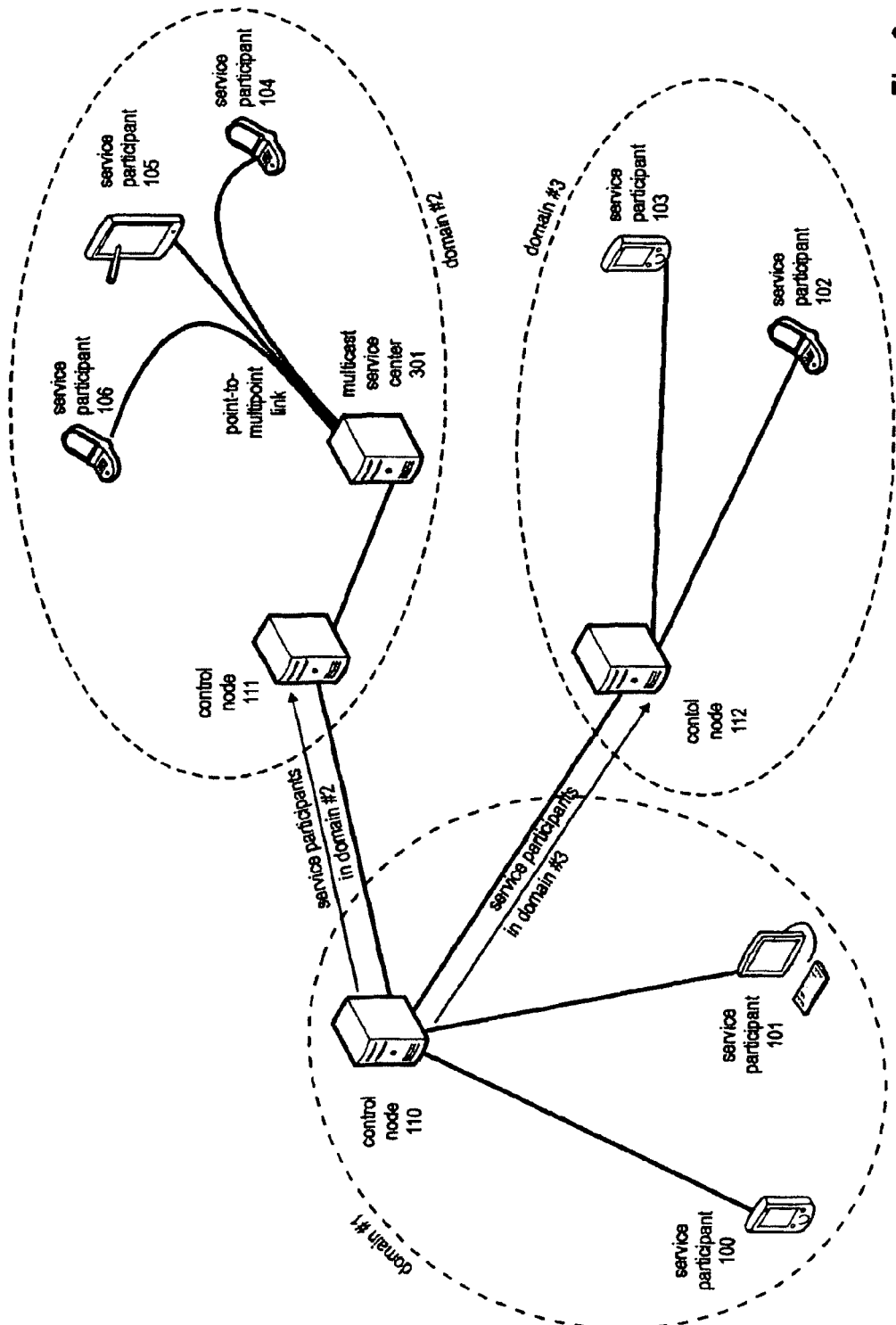
FIG. 3 shows another exemplary overlay-network providing data of an inter-domain multicast service to service participants according to another embodiment of the invention.

An exemplary architectural overview of a domain providing a multicast service transport mechanism is shown in FIG. 3. FIG. 3 corresponds to FIG. 1 except for domain #2, wherein the multicast service center 301 is included.

Upon receiving 407 multicast data of the service at the controlling node 111, same distributes 504 the multicast data to the service participants 104, 105, 106 in its domain. It should be noted that only if point-to-point links are to be used, controlling node 111 needs to generate copies of the multicast data for distribution.

Returning to FIG. 1 and FIG. 3 the operation of the controlling node 112 in domain #3 is similar to that of controlling node 111 in domain #2. Further, it should also be noted that the controlling nodes 111, 112 in domains #2 and #3 may also be capable of performing the operations of controlling node 110 in domain #1 in cases where they receive the initial service initiation request from a client. Similarly, controlling node 110 in domain #1 may perform the functions of controlling node 111 in domain #2 in the latter case.

In one embodiment of the invention outlined with respect to FIG. 5, the decision on which transport mechanism to utilize has been made by the controlling node 111 for the entire domain #2. However, as will be outlined below, the decision and also the switching between transport mechanisms may also be made on a per-radio network subsystem basis as will be outlined in the following.

Figure 2:
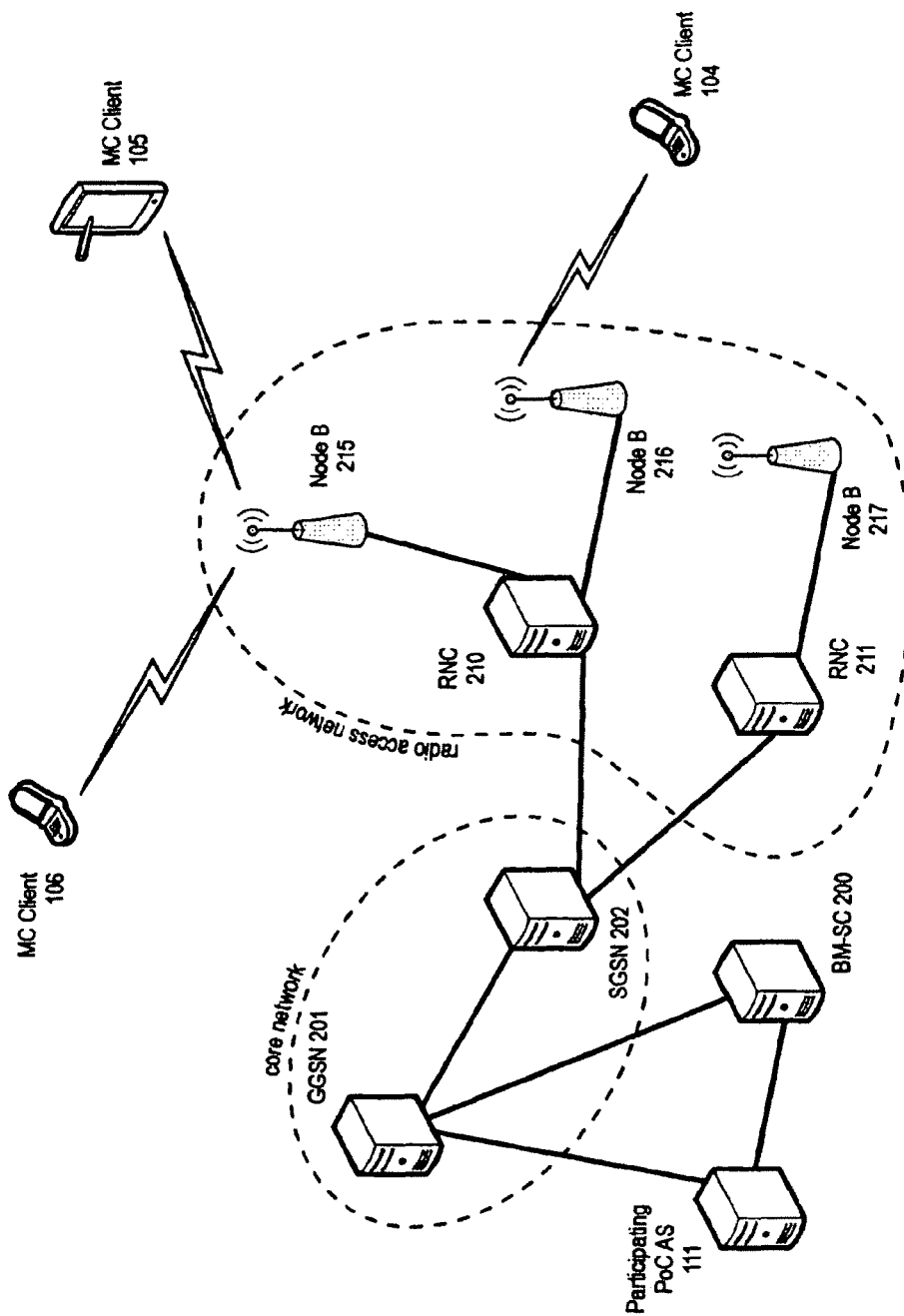
FIG. 2 shows an exemplary overview on the network architecture in one of the different domains in FIG. 1 according to an embodiment of the invention.

FIG. 2 shows an exemplary overview on the network architecture in one of the different domains in FIG. 1 according to an embodiment of the invention. In FIG. 2 it is assumed that domain #2 is a 3GPP network, such as UMTS that comprises a core network formed by GGSN 201 and at least one SGSN 202 (GGSN=Gateway GPRS Support Node; SGSN=Serving GPRS Support Node). The radio access network is connected to the core network via an interface between an SGSN 202 and a respective RNC 210, 211 (Radio Network Controller) of the radio access network. Each RNC is typically connected to one or more Node Bs 215, 216, 217 that transmit and receive data to/from the mobile terminals 104, 105, 106.

In current UMTS systems, the RNC 210, 211 terminates radio resource control and is therefore responsible for the establishment and control of air interface resources. In this respect, the RNC 210, 211 is also responsible for establishing the point-to-point links and/or point-to-multipoint link to service participants 104, 105, 106. If MBMS services are available in the UMTS network (as indicated by BM-SC 200 in the architecture), the RNCs establish a point-to-multipoint link to the terminals for each radio cell controlled by a respective Node B.

Hence, in this architecture it may be beneficial to decide the transport mechanism to utilize for the distribution of the multicast service data for each radio cell. In this embodiment of the invention the radio network subsystem corresponds to a radio cell controlled by a Node B. Accordingly, system resources for the distribution of the multicast data may be switched depending on the number of users currently receiving the multicast service within an individual cell.

In an alternative embodiment of the invention, the decision on the transport mechanism may also be made on a per-radio network subsystem basis, where the radio network subsystem is defined as a RNC and the Node Bs under its control (e.g. RNC 210 and Node Bs 215 and 216). Similarly, the switching of the utilized transport mechanism during service provision may be made on the radio network subsystem level.

Figure 6:
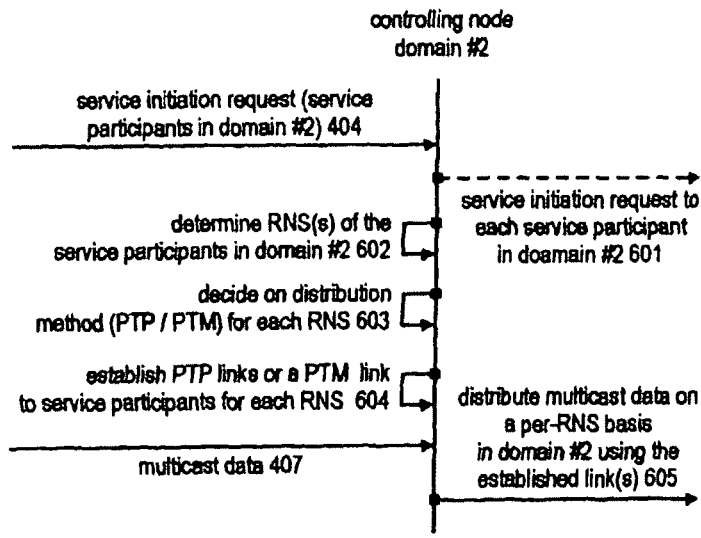
Figure 11:
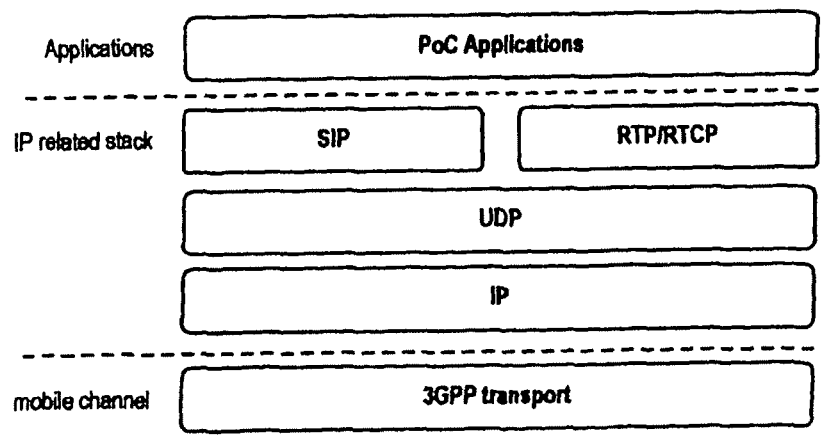
FIG. 11 shows a typical protocol stack for enabling a PoC IMS service.

FIG. 6 shows another exemplary operation of controlling node 111 within domain #2 enabling an inter-domain multicast service according to exemplary embodiments of the invention. In the embodiment exemplarily illustrated in FIG. 6, the decision on which transport mechanisms to utilize for the distribution of multicast service data within domain #2 is made on a per-radio network subsystem basis.

As in FIG. 5, the controlling node 111 first receives 404 a service initiation request indicating the service participants located in its domain #2 and may generate individual service initiation request for transmission 501 to the service participants 104, 105, 106.

Based on the identification of the service participants, the controlling node 111 of domain #2 may further determine 601 to which radio network subsystems the indicated participants belong.

For example, the radio network subsystem may be defined in a radio cell level; in this case the controlling node 111 determines that service participant 104 is served by Node B 216 and service participants 105 and 106 are served by Node B 215.

Based on this result, controlling node 111 may now decide 602 which transport mechanism to utilize in each of the determined radio network subsystems. For example, this decision is based on the number of service participants in a respective determined radio network subsystem, as already indicated above. According to the decision, controlling node 111 may further establish 603 the appropriate resources in the domain.

For example, if it is decided that participants 105 and 106 are to be served via a point-to-multipoint link, the controlling node 111 could establish a shared or common channel in the radio cell controlled by Node B 215 for this purpose. When utilizing a domain specific multicast service transport mechanism, the controlling node 111 could initiate the downlink multicast service provision via the multicast service center 301 and my forward the multicast data to the multicast service center 301 for distribution to participants 105 and 106 via a point-to-multipoint link.

In case of using a MBMS service function as a multicast service transport mechanism, the controlling node 111— which in this example may correspond to an IMS Application Server or PoC Application Server—initiates a MBMS service for participants 105 and 106. In this procedure, the controlling node 111 may register the participants 105 and 106 at the BM-SC 200 and obtains the multicast identifier (e.g. IP multicast address) of the MBMS service established by the BM-SC 200. This multicast identifier may be included in the service initiation requests transmitted to participants 105 and 106, so as to identify the resources via which the multicast data is provided to the participants.

For participant 104 the controlling node 111 could decide to use a point-to-point link for the multicast service. Accordingly, it may establish a dedicated channel to participant 104.

Upon reception 407 of multicast data at the controlling node 111, same may forward the multicast data towards the participants in its domain utilizing the established link(s).

Further details on how to operate a network (including how to decide upon the transport mechanism and on a conditional switching of same) comprising a controlling node 111 and multicast service center 301 are provided in the copending application number EP 06 001 019.6, "EFFICIENT MULTICAST SERVICE DATA PROVISION IN A MOBILE COMMUNICATION SYSTEM" (incorporated herein by reference) and application number EP 06 004 868.3 "EFFICIENT PROVISION OF A MULTICAST SERVICE BY SWITCHING BETWEEN MULTICAST SERVICES IN A MOBILE COMMUNICATION SYSTEM" (incorporated herein by reference) by the same applicant. In these documents, the controlling node corresponds to a IMS application server/PoC AS and the multicast service center to the BM-SC.

Figure 8:
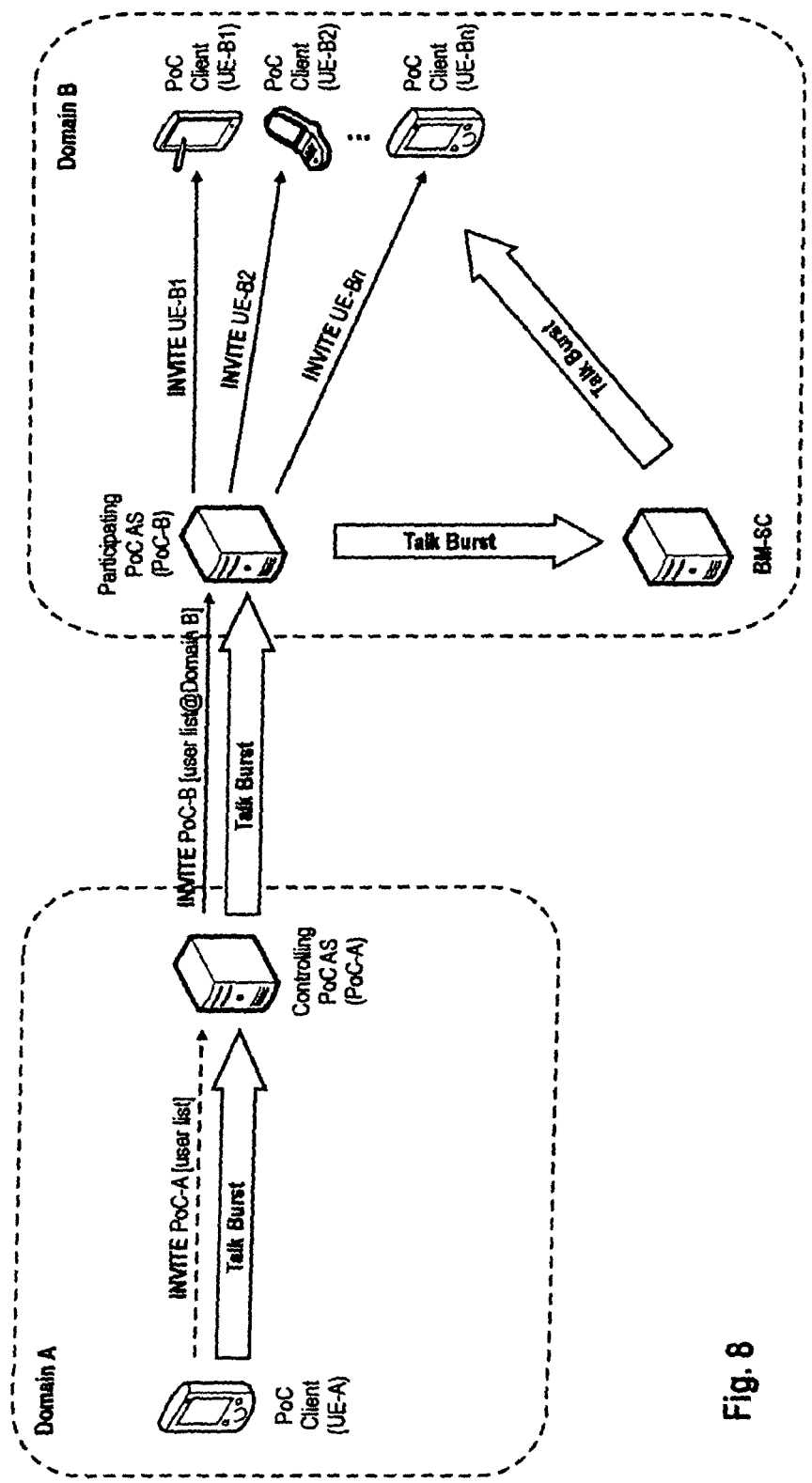
FIG. 8 illustrates the exemplary application of principles of the invention in the realization of an inter-domain PoC service in a MBMS enabled mobile communication system according to an exemplary embodiment of the invention.

In the following more detailed exemplary embodiments of the invention will be outlined using a PoC service as an illustrative example of a multicast service. FIG. 8 illustrates an exemplary application of principles of the invention in the realization of an inter-domain PoC service in a MBMS enabled mobile communication system according to an exemplary embodiment of the invention.

As discussed above, the one aspect of the invention is the distribution of functionality among nodes of different domains. For PoC calls that apply this idea, this means that certain functionality that is typically performed by the Controlling PoC, such as call set-up and session establishment, is distributed to the PoC AS in the different domains involved in the PoC call.

To facilitate this distribution of functionality, the Controlling PoC AS may establish a signaling dialog with all Participating PoC AS in the requested target domains. Within this dialog the Controlling PoC AS distributes respective user group information to the Participating PoC AS and establishes a single dedicated connection between the elements in the different domains (INVITE PoC-B [user list@Domain B]).

Each Participating PoC AS may decide locally on the transmission strategy (e.g. forwarding of the Talk Burst via MBMS service by BM-SC as shown in FIG. 8 or not) for the PoC call data, including utilization of MBMS transport functionality, and may be responsible for processing the call set-up request (INVITE UE-B1, . . . , INVITE UE-Bn).

Subsequently the Controlling PoC AS may transmits incoming voice data only once via the single dedicated connection to each target domain (Talk Burst transmitted from PoC-A to PoC-B). The local Participating PoC AS is responsible for distributing the data to the respective participants. If MBMS transport functionality is utilized, the Participating PoC AS forwards the single copy of the voice data (Talk Burst) to the BM-SC.

Thereby, the unnecessary transmission of multiple voice data copies can be avoided. A further benefit is that the availability of instant and reliable user group information at the Participating PoC AS might enhance the decision on MBMS utilization for the PoC call.

In a variation of the method described above with respect to FIG. 8, the initiating PoC user (UE-A) specifies the desired participants for the call in its SIP INVITE request. Upon reception of this message, the Controlling PoC AS inspects the list and groups the requested users according to their domains, e.g., into sub-lists for each domain. Instead of signaling each user separately, the Controlling PoC AS issues a single SIP INVITE request containing the generated sub-list to the PoC AS in the respective domain. The Controlling PoC AS might use a well-known identity or some previously obtained information to directly address the PoC AS in the target domain.

Upon reception of this message at the Participating PoC AS in the target domain, the Participating PoC AS can determine that it should carry out Controlling PoC function instead of the standard Participating PoC function, because the request is received from another PoC AS in another domain. The Participating PoC AS uses the obtained group information to signal the requested PoC users and generates appropriate SIP INVITE messages. Further, the Participating PoC AS might use the group information in the decision whether to utilize MBMS transport functionality for the requested PoC call.

The Participating PoC AS sends an appropriate SIP response back to the Controlling PoC AS in the other domain. This can be done directly after reception of the respective SIP INVITE request for the Controlling PoC AS or after reception of all responses from the signaled PoC users in the local domain. The behavior might depend on the specific implementation of the Participating PoC AS. In any case the successful completion of the SIP dialog with the Controlling PoC AS results in the establishment of a single dedicated connection for media transmission between the PoC AS in the different domains.

This procedure is carried out for any target domain present in the user group information of the initial request received at the Controlling PoC AS. As a result there might be several such dedicated connections between the Controlling PoC AS and Participating PoC AS in different domains. Now, if the Controlling PoC AS receives voice data from a PoC user, it utilizes the dedicated connections to distribute the data exactly once to the associated Participating PoC AS. Assuming utilization of MBMS in the target domain, the Participating PoC AS forwards this single copy of the voice data to the BM-SC, which transmits it via the MBMS bearer to the PoC users in the local domain. Therefore, all PoC users receive the voice data only once and unnecessary transmission of multiple copies of the same data can be avoided.

Figure 7:
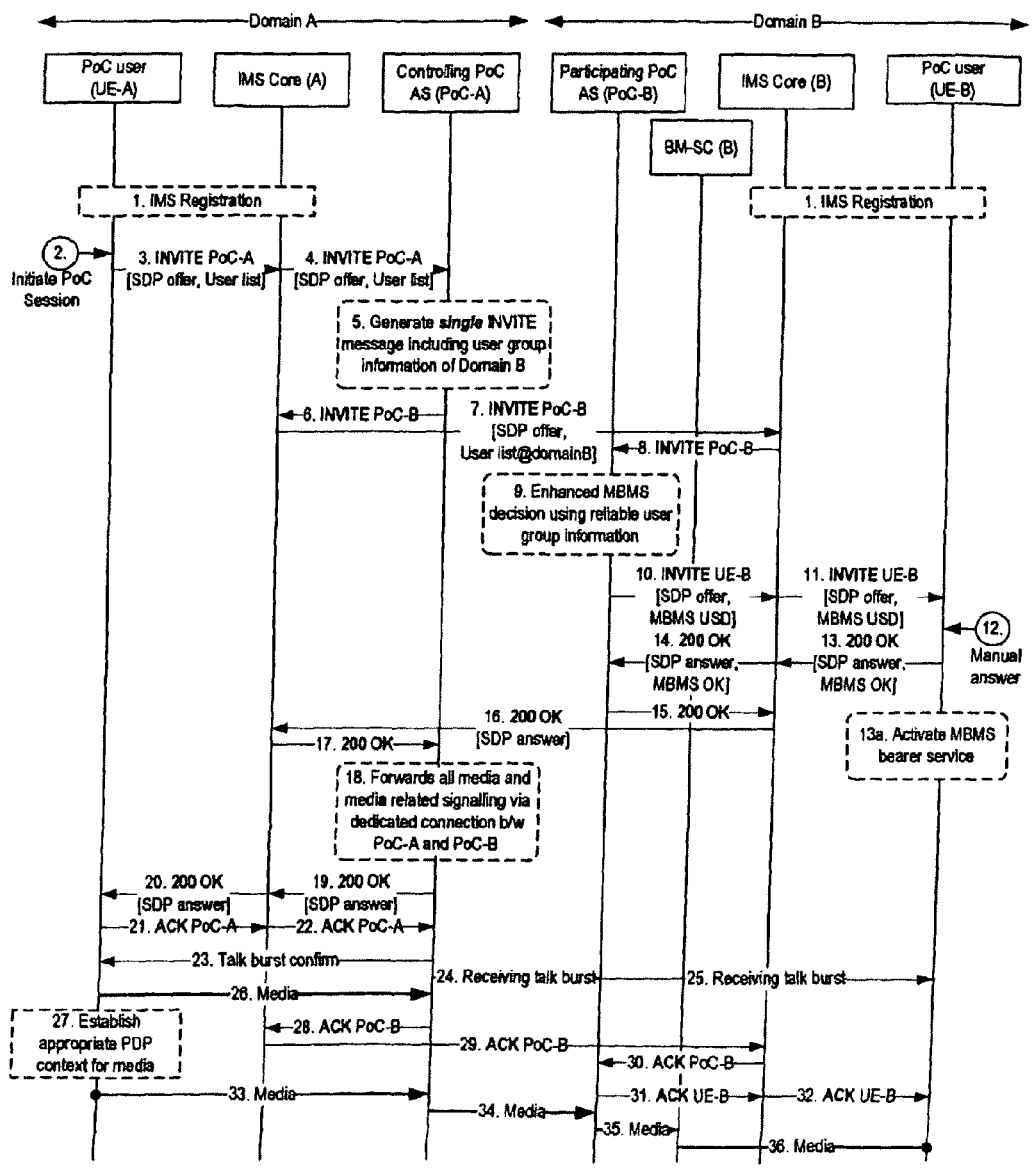
FIG. 7 shows a signaling diagram for establishing a PoC service in a MBMS-enabled mobile communication system according to an exemplary embodiment of the invention.

FIG. 7 shows a signaling diagram for establishing a PoC service in a MBMS-enabled mobile communication system according to an exemplary embodiment of the invention. For exemplary purposes a service spanning two domains is assumed (though the principles are also applicable to a service spanning several domains). In a first domain A a PoC user (UE-A) initiates a service to at least one participant in Domain B (UE-B).

The signaling flow exemplarily shows a single PoC user (UE-B) in the target domain. However, in the general case there can be many different target domains hosting any number of requested participants. Further, for the signaling flow it is assumed that the PoC users utilize a GPRS-based IP-CAN to access their local IMS network and the target domain supports MBMS transport functionality. Regarding access to the IMS network, the initiating user does not necessarily have to use GPRS and could use any IP-CAN as long as it provides access to the respective IMS network.

If no IP address has been assigned yet to the user (UE-A) it ensures that a PDP context suitable for IMS related signalling and—if necessary—an additional general-purpose PDP context with the same APN (Access Point Name) and IP address as the PDP context for IMS related signaling are established.

The terminal (UE-A) first registers itself in the IMS network (step 1). The registration is a prerequisite to be able to access any IMS service. In case a user (UE-A) likes to initiate a PoC call, the user (UE-A) creates a SIP session for the PoC communication by sending (step 2) an INVITE request into the IMS Core (A) that is forwarded to the Controlling PoC AS of domain A (PoC-A), in this example with UE-B as a destination address (alternatively the destination address could also be a PSI (Public Service Identity) hosted by a PoC server for a PoC group session).

The INVITE request comprises the PoC service indication and its SDP media parameters indicate the IP address obtained when establishing the PDP context and that UE-A is ready to send and receive media (assuming that in this example that UE-A establishes a non-real time PDP context for talk burst control and media at IMS registration time). For an ad-hoc group, the INVITE request further comprises a list of the requested users for the call. It is routed via the IMS network (A) to the PoC AS (PoC-A) (step 3 and 4).

Receiving this SIP INVITE message the PoC AS performs the Controlling PoC function and according to this embodiment of the invention groups the received user list by target domains (step 5).

As a next step, the Controlling PoC AS (PoC-A) generates a SIP INVITE message directed to a PoC AS in a target domain (PoC-B), including the list of requested users of that respective domain. This message is sent to the local IMS network and subsequently routed via the IMS network in the target domain to the desired PoC AS (steps 6-8). In a conventional system, the PoC AS receiving the INVITE message would carry out the Participating PoC function. However, as recognizes from the INVITE message that same has been sent from another PoC AS in another domain, the PoC AS of domain B knows that it should perform the Controlling PoC function regarding call set-up and session establishment.

Therefore, the Participating PoC AS (PoC-B) generates SIP INVITE messages for each user listed in the received message from the Controlling PoC AS (PoC-A). As this domain supports MBMS transport functionality, the Participating PoC AS uses the reliable group information to decide whether to utilize it for the PoC call (step 9).

For the depicted signaling flow it is assumed for exemplary purposes that the Participating PoC AS (PoC-B) decides to utilize existing MBMS transport functionality. Therefore, the generated SIP INVITE messages include the configuration parameters for the MBMS bearer, e.g. contained in a MBMS User Service Description. The PoC users in domain B receiving those messages from the Participating PoC AS (PoC-B) return an appropriate response and activate the respective MBMS bearer in the GPRS network. In case a terminal cannot support the reception of the MBMS bearer it would return an error message to the Participating PoC AS (PoC-B), which would then set-up a point-to-point connection for this PoC user. This procedure (steps 10-14) is carried out for each requested participant in the local domain of the Participating PoC AS (PoC-B).

The Participating PoC AS (PoC-B) returns an appropriate response to the SIP INVITE request received from the Controlling PoC AS (PoC-A) (steps 15-17). Depending on the implementation of the Participating PoC AS (PoC-B) this could be done after all responses have been received from the PoC users or already on the first response. In any case a positive response from the Participating PoC AS (PoC-B) to the Controlling PoC AS (PoC-A) establishes a single dedicated connection between the two elements. This connection is subsequently used to exchange single copies of voice data and in-band signaling between the PoC AS in the different domains (step 24 and 34). Finally, the Participating PoC AS (PoC-B) forwards the voice data received from the Controlling PoC AS to its associated BM-SC, which forwards it via the established MBMS bearer to the PoC users in the local domain (steps 35-36).

The methods and systems according to the different embodiments of the invention described above assume that the controlling nodes in the different domains involved in a multicast session support the enhanced apply the ideas and functional enhancements as described herein.

As already mentioned, a multicast service might span various domains, which are under the control of different operators. It may thus not be assumed that all operators have implemented the enhanced functionality as described herein in their local domain.

For example, even a single operator might not support the distributed Controlling PoC functionality in all its own PoC AS. Further, for various reasons it cannot be assumed that MBMS transport functionality is available in every domain. There might be no BM-SC deployed or associated with a PoC AS, or an exiting BM-SC does not provide the required resources for a PoC call.

Therefore, support of conventional controlling nodes and support of domains without specific multicast service transport functionality is desirable.

Figure 9:
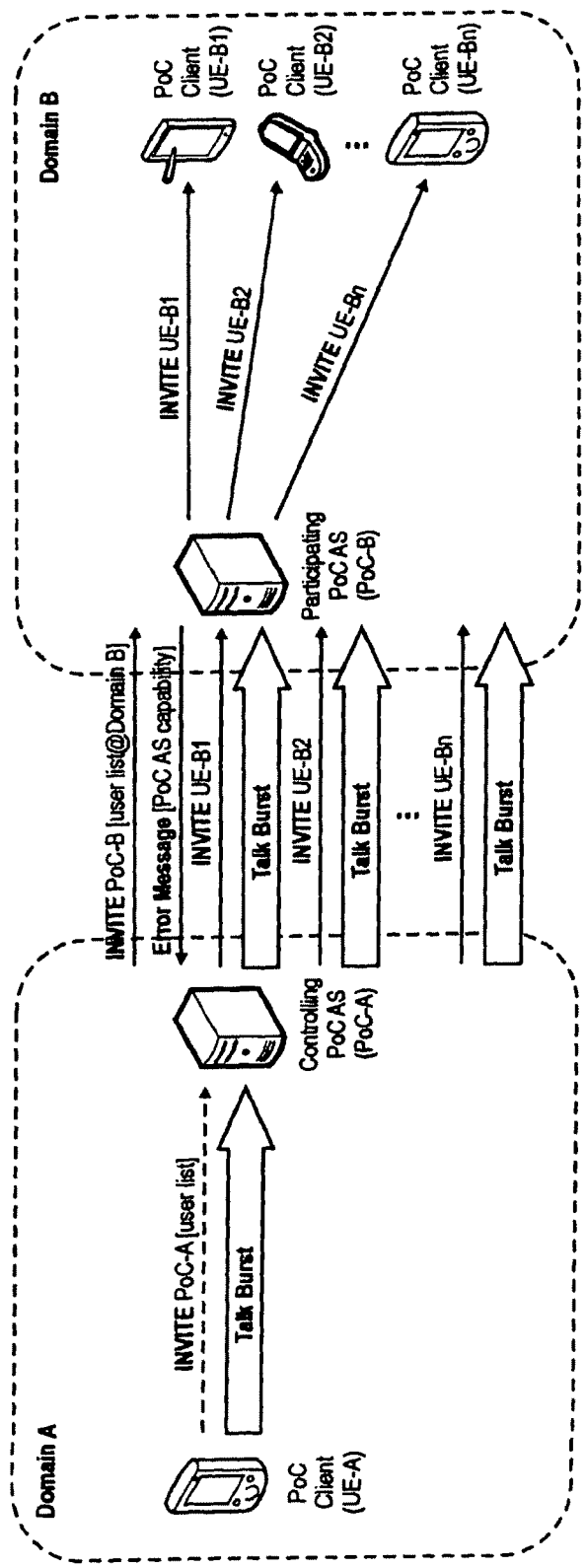
FIG. 9 shows an exemplary signaling procedure when setting up an inter-domain PoC service according to an exemplary embodiment of the invention, while maintaining backward compatibility to controlling nodes not being operated according to an exemplary embodiment of the invention.
Figure 10:
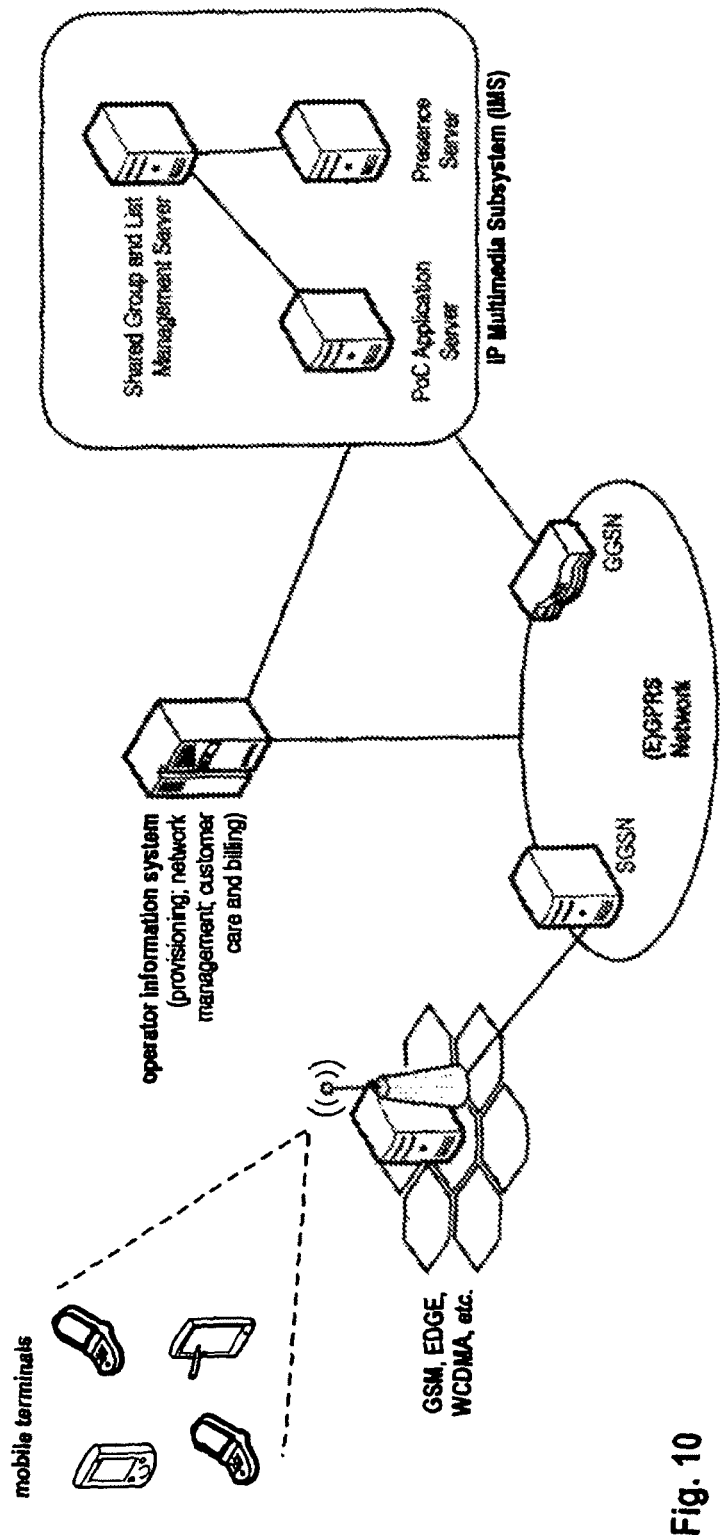
FIG. 10 shows an exemplary network architecture enabling IMS services.
Figure 12:
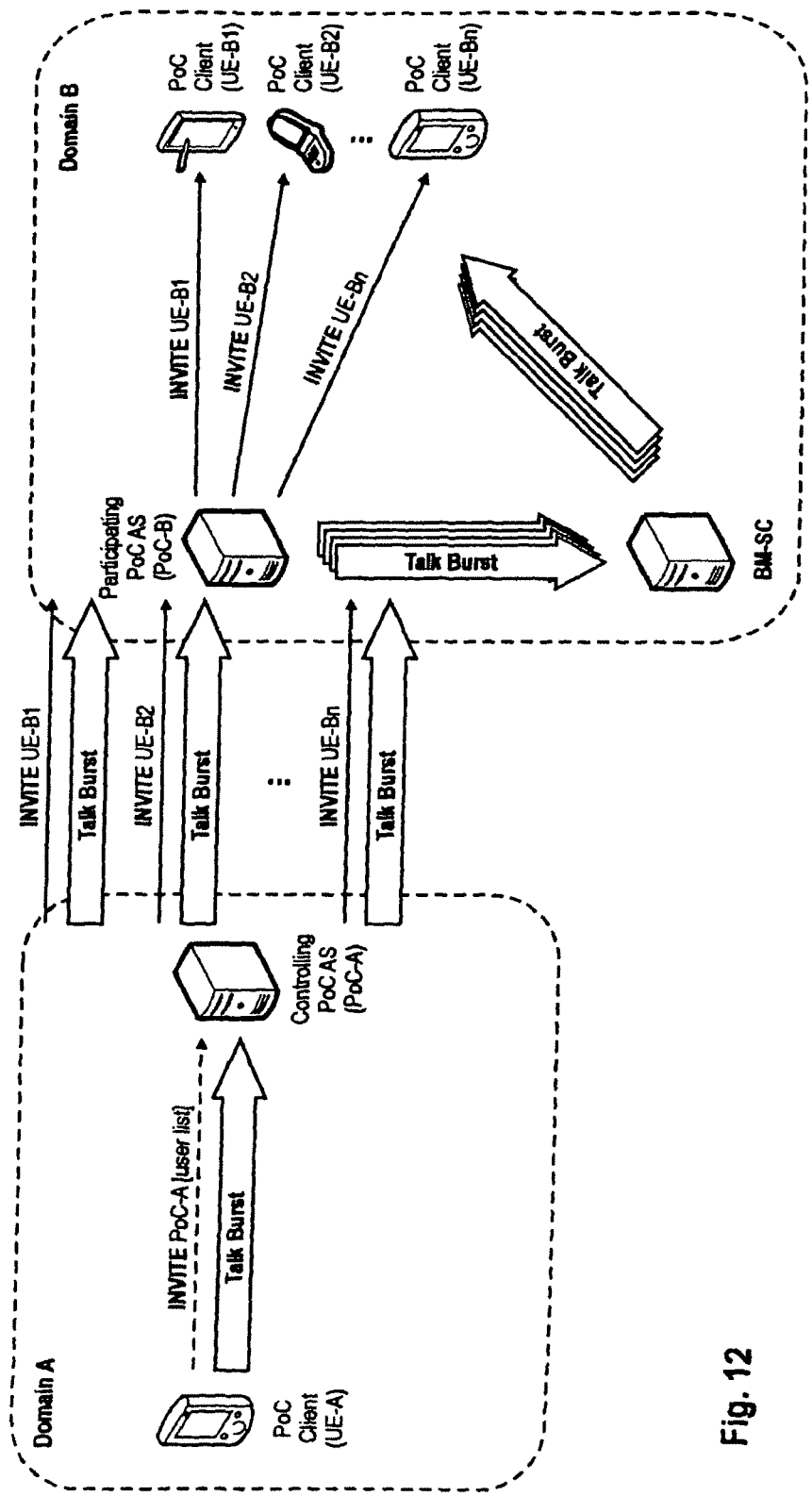
FIG. 12 shows an exemplary signaling procedure for enabling an inter-domain PoC service.

FIG. 9 shows an exemplary signaling procedure when setting up an inter-domain PoC service according to an exemplary embodiment of the invention, while maintaining backward compatibility to controlling nodes not being operated according to an exemplary embodiment of the invention. The Participating PoC AS (PoC-B) in domain B may be assumed to be a state of the art PoC AS. Further, for exemplary purposes only, it is assumed that no MBMS transport functionality is available in domain B. It should be noted that the procedure described below would not change, if MBMS transport functionality would be available in domain B.

The Controlling PoC AS sends a single SIP INVITE message directed to the PoC AS in the target domain containing the user group information in the respective domain as described above.

In case a legacy PoC AS not supporting the enhanced call control functionality is deployed in the target domain B, the PoC AS (PoC-B) rejects the received SIP INVITE request with an appropriate error message. According to this embodiment of the invention, the Controlling PoC AS sends separate SIP INVITE messages (INVITE B1, . . . , INVITE Bn) directed to each requested PoC user according to standard PoC behavior, if an error message is received from the PoC AS of the target domain.

In case an enhanced PoC AS without support for MBMS transport functionality is deployed in the target domain, there are various options how to handle the request. The PoC AS could perform Controlling PoC function and subsequently distribute the received voice data via individual point-to-point connections to the PoC users in its domain without informing the Controlling PoC AS. The PoC AS could inform the Controlling PoC AS of its local capabilities, whereas the Controlling PoC AS can decide to establish individual connections or a dedicated connection to the Participating PoC AS. Another option is that the PoC AS rejects the received request as described above.

In any case the initially requested PoC call can be established, no matter, if the target domain supports enhanced call control functionality or MBMS transport functionality.

The distributed controlling node functionality as described in the different embodiments herein uses a proactive scheme; i.e. first the controlling node tries to utilize the enhanced call control functionality by sending a single service initiation request message to the target domain. However, as described above, this results in additional signaling in case this is not supported in the target domain.

Another possibility is to use a reactive scheme. In this variant according to another embodiment of the invention, the controlling node of a first domain sends separate service initiation requests directed to each requested service participant in another domain. This establishes separate connections between the controlling nodes of the domains. If the controlling node in the target domain in which the service participants are located supports the utilization of specific multicast transport functionality (as for example MBMS transport functionality), it may inform the controlling node of the requesting source domain that it supports specific multicast transport functionality in the response messages sent for the received service initiation request messages.

Based on this information the controlling node in the source domain would be able to generate a list of aggregated users in the target domain. If it receives voice data from a service participant, it may thus distribute only a single copy to the controlling node of the target domain for further distribution to the service participants in the target domain. For the transmission the controlling node of the source domain may select one of previously established connections. The controlling node of the target domain would forward the received voice data to the multicast service center of the target domain for transmission via a point-to-multipoint bearer to its local service participants.

This exemplary operation according to an embodiment of the invention may also be used for PoC services. The distributed Controlling PoC functionality would only be utilized, if it is supported in the target domain, without any pre-knowledge about that domain.

However, the establishment of individual (unused) connections between the Controlling PoC AS in the initiating source domain and the Participating PoC AS in the target domain can be considered as a drawback of embodiment of the invention. Further, the Participating PoC AS only gains delayed and unreliable user group information. This might complicate the decision on MBMS utilization for a PoC call at the Participating PoC AS.

Another embodiment of the invention relates to the implementation of the above described various embodiments using hardware and software. It is recognized that the various embodiments of the invention above may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for distributing multicast data of a multicast service to different domains each controlled by a different Push-to-talk Over Cellular Application Server, PoC AS, the method comprising the following steps performed by PoC AS, of a first domain of the different domains:
   receiving from a client in the first domain a service initiation request for setting up the multicast service between a plurality of service participants, wherein the service initiation request identifies the plurality of service participants that are to participate in the multicast service,
   identifying, based on the identification of the plurality of service participants, the domains to which the plurality of service participants belong and that are not controlled by the PoC AS of the first domain, and
     distributing the multicast data to the PoC ASs of the identified domains on a per-domain basis,
     wherein the distributing of the multicast data to the PoC ASs of the identified domains comprises distributing a single copy of the respective multicast data via a point-to-point link to a PoC AS of a respective domain for further distribution to the service participants in the respective domain.

2. The method according to claim 1, further comprising transmitting another service initiation request to each of the PoC ASs of the identified domains, wherein the other service initiation request transmitted to each of the PoC ASs identifies service participants belonging to the respective domain controlled by the PoC AS.

3. The method according to claim 1, further comprising establishing a point-to-point link to the PoC AS of each of the identified domains on which the multicast data is to be forwarded to a respective PoC AS.

4. The method according to claim 1, wherein a single copy of the respective multicast data is distributed to the PoC AS of the respective domain, even if there is a plurality of service participants in the respective domain.

5. The method according to claim 1, further comprising:
   receiving a negative acknowledgment in response to a service initiation request from one of the PoC AS's of one of the identified domains, and
   in response to the negative acknowledgment, transmitting an individual service initiation request to each of the service participants in the domain controlled by the PoC AS responding with the negative acknowledgment.

6. A method for distributing multicast data of a multicast service to service participants in a first domain, the method comprising the following steps performed by a Push-to-talk Over Cellular Application Server, PoC AS, of the first domain:
   (a) receiving a service initiation request from a PoC AS of another domain comprising information on the service participants to participate in the multicast service being located in the first domain controlled by the PoC AS of the first domain,
   (b) deciding, based on the information on the service participants, whether to utilize point-to-point links or a point-to-multipoint link for distributing the multicast data within the first domain,
   (c) establishing, depending on the deciding step (b), either a point-to-point link to a respective one of the service participants in the first domain or a point-to-multipoint link to the service participants in the first domain as a transport medium for the multicast data, and (d) distributing the multicast data to the service participants in the first domain via the established transport medium, the method further comprising acknowledging the service initiation request thereby establishing a point-to-point link to the PoC AS of the another domain, wherein a multicast service identifier is used to identify data of the multicast service on the point-to-point link.

7. The method according to claim 6, further comprising determining at least one radio network subsystem serving the service participants, and wherein the deciding on the utilization of the point-to-point links or the point-to-multipoint link is made per determined radio network subsystem, and wherein a point-to-point link per service participant or a point-to-multipoint link is established in each determined radio network subsystem.

8. The method according to claim 6, wherein, during multicast service provision, the transport medium is switched from point-to-point links to a point-to-multipoint link or vice versa depending on a number of service participants currently participating in the multicast service within the domain.

9. The method according to claim 8, wherein the switching from point-to-point links to a point-to-multipoint link is made on a per-radio network subsystem basis.

10. The method according to claim 6, further comprising forwarding the multicast data to a multicast service center within the first domain, in case the point-to-multipoint link is to be used for distributing the multicast data.

11. The method according to claim 6, further comprising associating the multicast service identifier with a multicast service identifier used by a multicast service center within the first domain to identify the multicast service data when being distributed to the service participants in the first domain.

12. The method according to claim 6, further comprising generating another service initiation request for each service participant identified in the service initiation request received from the PoC AS of the other domain, and transmitting the at least one generated other service initiation request to the service participants of the first domain.

13. The method according to claim 12, wherein the other service initiation request for each service participant comprises a multicast service identifier to be used by the multicast service center within the first domain to identify the multicast service data.

14. The method according to claim 6, wherein the PoC AS of the first domain subscribes the service participants of the first domain at a multicast service center within the first domain.

15. A Push-to-talk Over Cellular Application Server, PoC AS, of a first domain for distributing multicast data of a multicast service to different domains each controlled by a different PoC AS, the PoC AS of the first domain comprising:
a receiver to receive from a client in the first domain a service initiation request for setting up the multicast service between a plurality of service participants, wherein the service initiation request identifies the plurality of service participants that are to participate in the multicast service,
a processor to identify, based on the identification of the plurality of service participants, the domains to which the plurality of service participants belong and that are not controlled by the PoC AS of the first domain, and
a transmitter to distribute the multicast data to the PoC ASs of the identified domains on a per-domain basis,
wherein the distributing of the multicast data to the PoC ASs of the identified domains comprises distributing a single copy of the respective multicast data via a point-to-point link to a PoC AS of a respective domain for further distribution to the service participants in the respective domain.

16. A system comprising at least one PoC AS according to claim 15.

17. A Push-to-talk Over Cellular Application Server, PoC AS, of a first domain for distributing multicast data of a multicast service to service participants in the first domain comprising:
a receiver to receive a service initiation request from a PoC AS of another domain comprising information on service participants to participate in the multicast service being located in the first domain controlled by the PoC AS,
a processor to decide based on the information on the service participants, whether to utilize point-to-point links or a point-to-multipoint link to distribute the multicast data within the first domain, and to establish, depending on the decision, either a point-to-point link to a respective one of the service participants in the first domain or a point-to-multipoint link to the service participants in the first domain as a transport medium for the multicast data, and
a transmitter to distribute the multicast data to the service participants in the first domain via the established transport medium, and to acknowledge the service initiation request thereby establishing a point-to-point link to the PoC AS of the another domain, wherein a multicast service identifier is used to identify data of the multicast service on the point-to-point link.

18. A system comprising at least one PoC AS according to claim 17.

19. A non-transitory computer readable medium storing instructions that, when executed by a processor of a Push-to-talk Over Cellular Application Server, PoC AS, of a first domain of different domains each controlled by a different PoC AS, cause the PoC AS of the first domain to distribute multicast data of a multicast service to different domains, by:
receiving from a client in the first domain a service initiation request for setting up the multicast service between a plurality of service participants, wherein the service initiation request identifies the plurality of identifying service participants that are to participate in the multicast service,
identifying, based on the identification of the plurality of service participants, the domains to which the plurality of service participants belong and that are not controlled by the PoC AS of the first domain, and
distributing the multicast data to the PoC ASs of the identified domains on a per-domain basis,
wherein the distributing of the multicast data to the PoC ASs of the identified domains comprises distributing a single copy of the respective multicast data via a point-to-point link to a PoC AS of a respective domain for further distribution to the service participants in the respective domain.

20. A non-transitory computer readable medium storing instructions that, when executed by a Push-to-talk Over Cellular Application Server, PoC AS, of a first domain, cause the PoC AS of the first domain to distribute multicast data of a multicast service to service participants in the first domain, by:
receiving a service initiation request from a PoC AS of another domain comprising information on the service participants to participate in the multicast service being located in the first domain controlled by the PoC AS, deciding based on the information on the service participants, whether to utilize point-to-point links or a point-to-multipoint link for distributing the multicast data within the first domain, establishing, depending on the deciding, either a point-to-point link to a respective one of the service participants in the first domain or a point-to-multipoint link to the service participants in the first domain as a transport medium for the multicast data, distributing the multicast data to the service participants in the first domain via the established transport medium, and acknowledging the service initiation request thereby establishing a point-to-point link to the PoC AS of the another domain, wherein a multicast service identifier is used to identify data of the multicast service on the point-to-point link.

* * * * *